United States Patent Office.

JOSEPH HOCHHACKER AND RUDOLF SULZER, OF BROOKLYN, NEW YORK.

STARCH-POLISH.

SPECIFICATION forming part of Letters Patent No. 363,235, dated May 17, 1887.

Application filed December 31, 1886. Serial No. 223,125. (No specimens.)

*To all whom it may concern:*

Be it known that we, JOSEPH HOCHHACKER and RUDOLF SULZER, both citizens of the United States, residing at Brooklyn, in the county of Kings and State of New York, have invented new and useful Improvements in Starch-Polish, of which the following is a specification.

This invention relates to starch-polish, as fully set forth in the following specification and claim.

The starch-polish consists of the following ingredients, combined in substantially the proportions stated, namely: stearine, sixty-eight parts by weight; paraffine, six parts by weight; borax, ten parts by weight; starch, twelve parts by weight; gum-arabic, four parts by weight.

The polish is manufactured as follows: The stearine and paraffine are melted together in a water bath, and benzine is added to the mixture of stearine and paraffine. The amount of benzine taken is about twenty per cent., by weight, of the mixture of stearine and paraffine. The benzine renders the mixture brittle and pulverizable. A thoroughly-warmed mixture of borax, starch, and gum-arabic, preferably in the form of powder, is then slowly added under constant agitation to the stearine and paraffine. The temperature must be kept at that of boiling water until the stearine, paraffine, borax, starch, and gum-arabic are thoroughly mixed. The mass thus obtained is poured into suitable forms or molds and cooled in ventilated rooms or spaces to about 40° Fahrenheit, whereby the greater part of the benzine which may remain is driven off.

The starch-polish is used as follows: To one-quarter pound of raw or ordinary starch add about three table-spoonfuls of the polish; add, while stirring, some cold water, and boil the preparation like common starch. The starch supplied with polish must be used in a heated state.

The use of benzine, above referred to, renders the polish brittle and readily pulverizable.

What we claim as new, and desire to secure by Letters Patent, is—

The herein-described composition of matter, consisting of stearine, paraffine, borax, starch, and gum-arabic, substantially in the proportions specified.

In testimony whereof we have hereunto set our hands and seals in the presence of two subscribing witnesses.

JOSEPH HOCHHACKER. [L. S.]
RUDOLF SULZER. [L. S.]

Witnesses:
ALFRED BERNHEIM,
GUSTAV KAISER.